H. Miller,
Flower Pot.

No. 92,203.          Patented July 6. 1869.

Witnesses: Isaac A. Brownell, George Miller

Inventor: Henry Miller

UNITED STATES PATENT OFFICE.

HENRY MILLER, OF CRANSTON, ASSIGNOR TO HIMSELF AND GEO. O. MILLER, OF JOHNSTON, RHODE ISLAND.

IMPROVEMENT IN METALLIC FLOWER STANDS AND HOLDERS.

Specification forming part of Letters Patent No. 92,203, dated July 6, 1869; antedated January 6, 1869.

*To all whom it may concern:*

Be it known that I, HENRY MILLER, of Cranston, in the county of Providence and State of Rhode Island, have invented a new and Improved Metallic Flower Stand and Holder; and I do hereby declare that the following is a full, clear, and exact description of the same, reference being had to the accompanying drawings, making part of this specification, in which—

Figure 1:
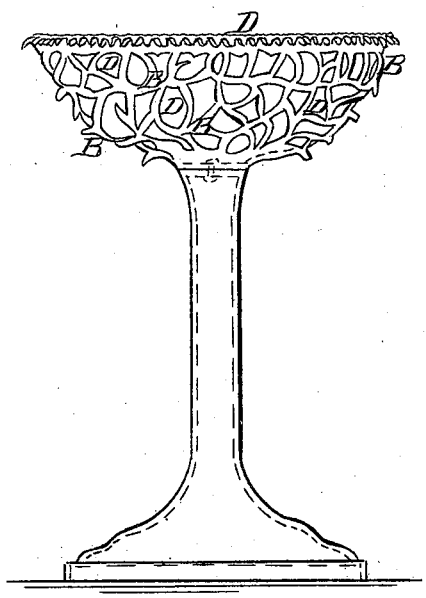
Figure 2:
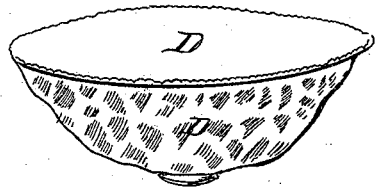

Figure 1 represents my improved flower stand and holder. Fig. 2 represents the pan, hereinafter mentioned separately.

Similar letters indicate corresponding parts in both figures.

The nature of my invention consists of an ornamental metallic basket, and a metallic disk closely fitting the interior of said basket, to be either mounted on a standard or suspended from a tree or veranda-roof, for the reception of cut flowers, bouquets, or growing plants or vines, the same constituting a new article of manufacture.

In the drawings, B is the metallic basket, which may be made in imitation of a net-work of vines, or of diamond, hexagonal, or other regularly-shaped meshes, and the edge thereof ornamented and provided with hooks, rings, or eyes, by which it may be suspended, and which may also be secured to the top of an ornamental standard of cast metal, or a column of stone, by a bolt or rivet through its base, as shown in the drawings. This basket forms a receptacle or holder for the cast-metal dish D, which is made to fit closely the interior of the basket, so that the dish within the basket has the effect of being supported by a natural net-work of growing vines, particularly when, as is the intention, the vine-work of the basket is painted in imitation of interlacing vines, and the dish within is painted with some appropriately-contrasting color. The close fitting of the said dish is accomplished by first producing from the interior of the basket itself a mold in relief, and then using this as the pattern for forming the mold for the exterior of the dish, by which the exact reverse shape of the interior of the basket is produced and made the exterior surface of the dish; after which, by means of another pattern, a mold in relief is formed of the interior of the dish, and the two parts being put together, the mold of the dish is formed, which, after being once cast, may be afterward used as a pattern for other dishes of corresponding shape.

What I claim as my invention, and desire to secure by Letters Patent, is—

The combined cast metal basket and close-fitting dish, constructed substantially as herein described, as a new article of manufacture.

HENRY MILLER,

Witnesses:
ISAAC A. BROWNELL,
GEORGE MILLER.